United States Patent
Minamikawa

[19]
[11] Patent Number: 6,122,067
[45] Date of Patent: *Sep. 19, 2000

[54] METHOD OF AND APPARATUS FOR FORMING COMPRESSED IMAGES TO BE SEEN THROUGH A LENTICULAR FILM

[75] Inventor: Yukio Minamikawa, Osaka, Japan

[73] Assignee: Photo Craft Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/907,892

[22] Filed: Aug. 11, 1997

[30] Foreign Application Priority Data

Aug. 21, 1996 [JP] Japan ................... 8-2196615

[51] Int. Cl.[7] .................................................. G06F 15/00
[52] U.S. Cl. .............................. 358/1.15; 355/22
[58] Field of Search .................... 395/101, 102, 395/105, 106, 109, 111, 114, 115, 117; 355/2, 18, 22, 27, 28, 29, 33, 34, 56, 77, 88; 358/501, 509, 523, 530, 537, 539, 540; 382/232, 239, 240

[56] References Cited

U.S. PATENT DOCUMENTS

| 5,019,855 | 5/1991 | Lam | 355/22 |
|---|---|---|---|
| 5,488,451 | 1/1996 | Goggins | 355/77 |
| 5,555,322 | 9/1996 | Terai et al. | 382/232 |
| 5,581,402 | 12/1996 | Taylor | 359/463 |
| 5,583,971 | 12/1996 | Lo | 395/117 |
| 5,600,402 | 2/1997 | Kainen | 355/22 |
| 5,642,226 | 6/1997 | Rosenthal | 359/619 |
| 5,696,596 | 12/1997 | Taniguchi | 358/300 |
| 5,825,466 | 10/1998 | Lo et al. | 355/33 |
| 5,896,230 | 4/1999 | Goggins | 355/22 |

FOREIGN PATENT DOCUMENTS 6-309431 11/1994 Japan.

*Primary Examiner*—Dov Popovici
*Assistant Examiner*—Gabriel I. Garcia
*Attorney, Agent, or Firm*—Birch, Stewart, Kolasch & Birch, LLP

[57] ABSTRACT

A method and apparatus for forming compressed images, to be seen through a lenticular film, reduces the time required for the formation of the compressed images and maintains an acceptable quality of the compressed images. First image data relating to a plurality of original images having different parallaxes are stored in a memory and later edited. Second image data relating to a plurality of linear fragmentary images are formed by dividing the edited first image data into sections such that the dividing lines run parallel with a longitudinal direction of the original images. The linear fragmentary images are thereafter expanded in the longitudinal direction. Compressed images are formed by interleaving the linear fragmentary images.

6 Claims, 5 Drawing Sheets

METHOD OF AND APPARATUS FOR FORMING COMPRESSED IMAGES TO BE SEEN THROUGH A LENTICULAR FILM

FIELD OF THE INVENTION

This invention relates to a method of and an apparatus for forming compressed images to be seen through a lenticular film.

BACKGROUND OF THE INVENTION

Various stereophotographs to be seen through lenticular films are known. These stereophotographs are taken as follows:

A plurality of photographs of an object are taken by means of a camera designed to take stereophotographs. A plurality of photographic films having different parallaxes are thus obtained. These photographic films are used as original images and subjected to exposure so that a compressed image may be formed on each of long and narrow photographic papers disposed under a lenticular film. The compressed images represent portions of the object compressed in the transverse direction of the long and narrow photographic papers.

The photographic papers are developed when they have been subjected to exposure. A stereophotograph is obtained when a lenticular film has been mounted on, and secured to, the developed photographic papers. This prior art method has a disadvantage that considerable time is required for the execution of the exposure step.

According to a further previously proposed method (see the Japanese Laid Open Patent Application No. 6-309431), compressed images are formed directly from original images by computer picture processing and printed on the paper by means of a printer.

According to this background art method, image data on the original images are edited and subjected to computer graphics in the transverse direction and in a reduction ratio equivalent to the reciprocal of the number of images. Reduced images thus obtained are divided into sections such that the dividing lines run parallel with the longitudinal direction and cause a plurality of line images to be formed in the longitudinal direction. These line images are arranged in order and printed.

For example, let it be supposed that three photographs having different parallaxes are read by an image scanner. Raw image data DPA, DPB and DPC as shown in FIG. 5 are obtained therefrom. When these raw image data have been edited, edited image data DEAj, DEBj and DECj are obtained. Reduced image data DRAj, DRBj and DRCj are obtained when the edited image data DEAj, DEBj and DECj have been reduced to one-third in the transverse direction. Reduced images thus obtained are divided into sections such that the dividing lines run parallel with the longitudinal direction and cause a plurality of line images to be formed in the longitudinal direction. These line images are arranged in order and printed. A reduced image FPJ is thus obtained.

This background art method has a disadvantage that, since a large quantity of raw image data DPA, DPB and DPC have to be processed, considerable time is required for the prosecution of the editing step and hence for forming compressed images. In addition, a large storage region is required for processing a large quantity of raw image data.

For example, when the quantity of each of the raw image data DPA, DPB and DPC amounts to 40 megabytes, 120 megabytes of a memory capacity are required and a large number of memories are also required for the RAM region to be used for editing the image data. Considerable time is required also for data transfer.

In view of the aforesaid problems, a principal object of this invention is to provide a method and apparatus of the aforesaid character in which the time required for the formation of compressed images is greatly lessened and yet the quality of the compressed images comes up to a marketable level.

SUMMARY OF THE INVENTION

A method in accordance with the present invention comprises the steps of allowing image data on a plurality of original images having different parallaxes to be stored in a memory, forming image data on a plurality of linear fragmentary images on the basis of the image data on the original images, the linear fragmentary images being formed by dividing the original images into sections such that the dividing lines run parallel with the longitudinal direction, the linear fragmentary images being thereafter expanded in the longitudinal direction, and forming compressed images by arranging the image data on the linear fragmentary images.

The method may further comprise the image data on the linear fragmentary images being formed after the editing of the original images.

The method may further comprise the expansion ratio to be applied to the linear fragmentary images when they are expanded in the longitudinal direction being made equal to the number of images disposed under a lenticule.

The method may further comprise the compressed images being formed by unwinding the linear fragmentary image data in a bit map memory.

The method may further comprise the compressed images being formed when the image data on the linear fragmentary images are printed on a sheet of paper.

An apparatus in accordance with the present invention comprises memory means for storing image data on a plurality of original images having different parallaxes, means for forming edited images by editing the original images, means for forming image data on a plurality of linear fragmentary images on the basis of the image data on the edited images, the linear fragmentary images being formed by dividing the edited images into sections such that the dividing lines run parallel with the longitudinal direction, the linear fragmentary images being thereafter expanded in the longitudinal direction, and means for forming compressed images by unwinding the linear fragmentary image data in a memory or by printing the same on a sheet of paper.

DETAILED DESCRIPTION

Figure 4:
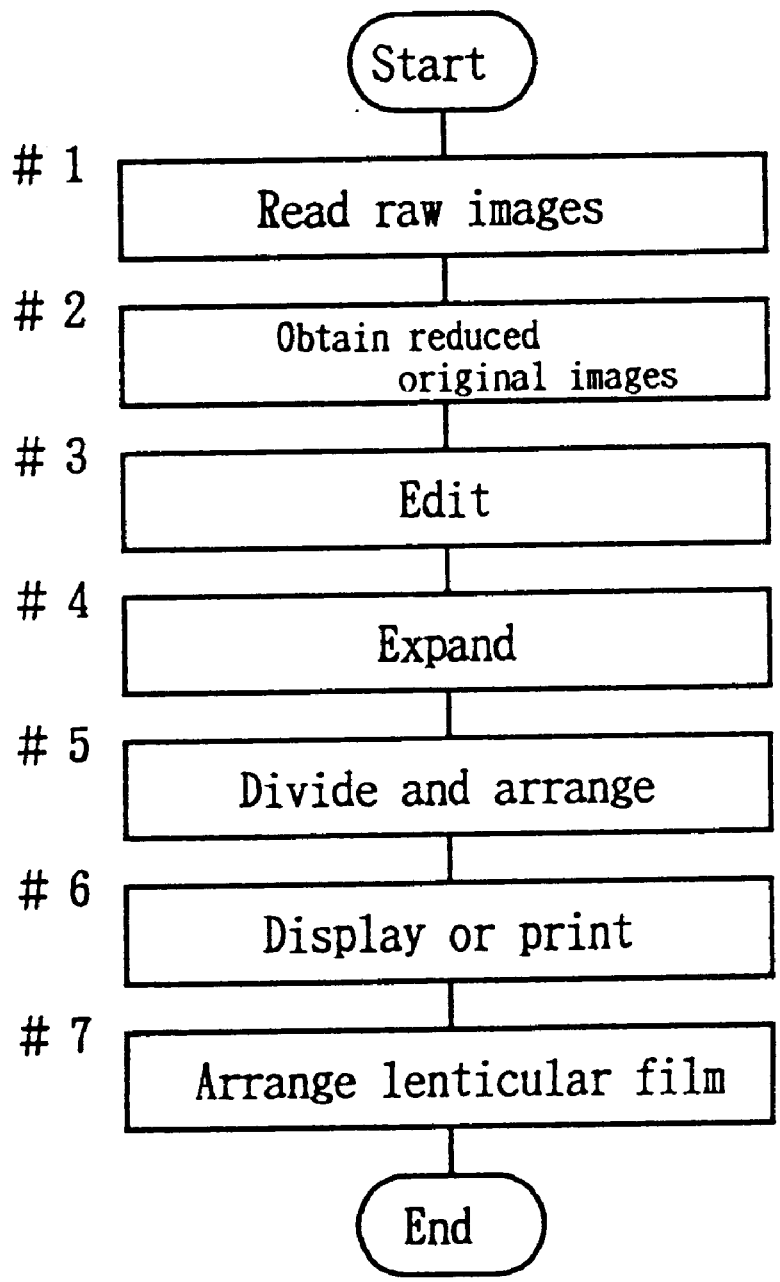
FIG. 4 is a flow diagram representing successive steps in a typical practice of forming a stereophotograph by means of the apparatus.
Figure 5:
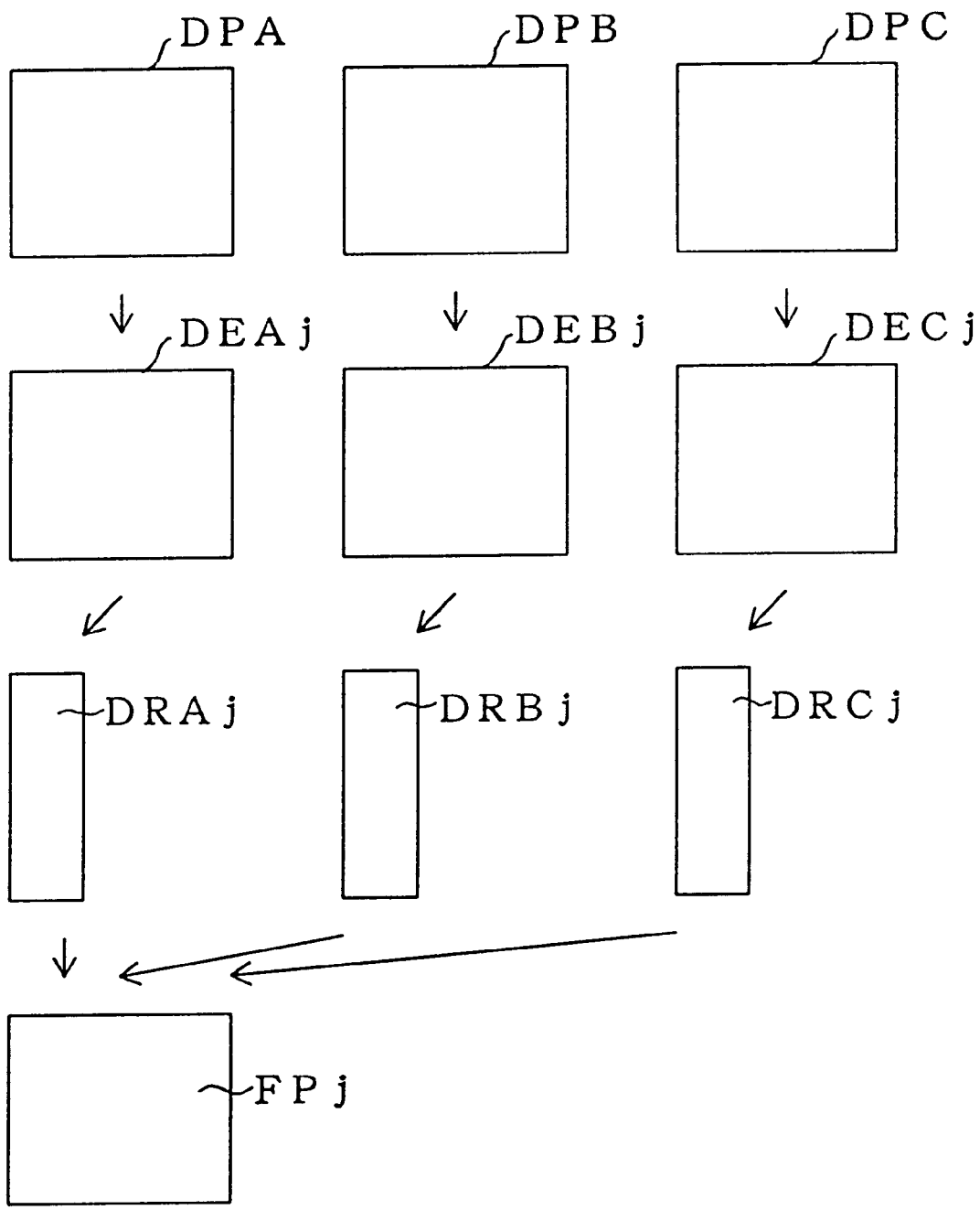
FIG. 5 is a view showing how a compressed image has been formed by a background art apparatus.

Successive steps in a typical practice of a method in accordance with the invention is shown in FIG. 4.

By way of preliminary arrangements, raw image data are obtained when three photographs having different parallaxes have been read by an image scanner (step 1). Reduced image data (i.e. original images) are obtained when the raw image data have been reduced to one-fifth in the longitudinal and transverse directions (step 2). Edited image data are obtained when the original images have been edited (step 3). Various edit modes such as conversion of color, insertion of characters, patching or composition of images are known.

Expanded image data are obtained when the edited image data have been expanded in the longitudinal direction to such an extent that the edited image data after the expansion is three times as long as the edited image data before the expansion (step 4). A plurality of linear fragmentary image data are formed by dividing each of the expanded image data into sections such that the dividing lines run parallel with the longitudinal direction. The width of a linear fragmentary image data resulting from the aforesaid division depends on the width of a lenticule and on the sizes of images to be printed on the paper on the basis of the linear fragmentary image data.

The linear fragmentary image data are arranged in order and written in bit map RAM so as to be formed into a compressed image (step 5). Compressed images are printed on the paper by means of a printer (step 6).

A stereophotograph is obtained when a lenticular film has been mounted closely on, and secured to, the paper on which the compressed images are printed (step 7). On the other hand, compressed images written in the RAM can be displayed on the screen of a display unit. When an observer looks at the screen through a lenticular film, he is confused into thinking that he is looking at a three-dimensional object.

The expansion ratio to be applied to the linear fragmentary images when they are expanded in the longitudinal direction is made equal to the number of images disposed under a lenticule. Especially in this embodiment, the expansion ratio is made equal to the number of original images.

An important feature of the invention is that only a short time is required for editing the data because the original images containing only a small amount of data are edited.

By the expression "compressed images" as used herein is meant the "images disposed under a lenticular film and adapted to be seen therethrough", irrespective as to whether or not the compressed images have been actually compressed (or contracted) in the course of forming the compressed images. This means that there are some cases where the compressed images have not been compressed (or contracted) at all or they have only been expanded in the longitudinal direction.

The word "image" occasionally used herein as the meaning of "image data".

Figure 1:
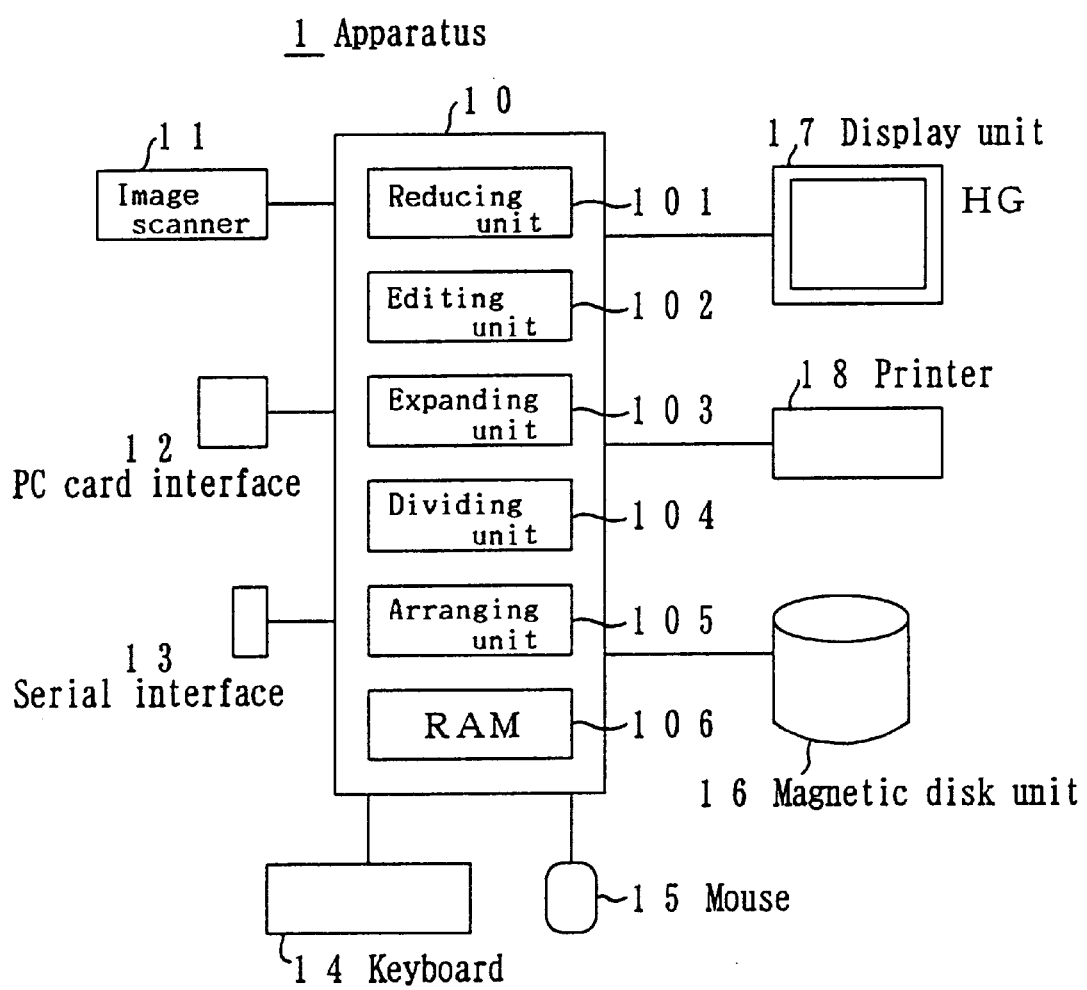
FIG. 1 is a block diagram of an apparatus for forming compressed images in accordance with the invention.

The apparatus 1 shown in FIG. 1 comprises a processor 10, image scanner 11, PC card interface 12, serial interface 13, keyboard 14, mouse 15, magnetic disk unit 16, display unit 17 and printer 18.

Images such as photographs are read by the image scanner 11, which preferably attains a density of picture elements of about 1,200 dpi.

A PC card is connected to the PC card interface 12 in order to allow the processor 10 to receive image data obtained by means of a digital camera (not shown).

The serial interface 13 is directly connected to the digital camera (not shown) by means of a cable in order to allow the processor 10 to receive image data obtained by means of the digital camera.

The keyboard 14 is a means for bringing commands or data into the processor 10. Alternatively, an operator may bring commands or data into the processor 10 by clicking a push-button provided on the mouse 15 while observing the screen of the display unit 17.

The magnetic disk unit 16 stores image data brought into the processor 10, edited image data, contracted image data or compressed image data and a program to be executed by the processor 10. The magnetic disk unit 16 corresponds to a memory or a memory means referred to hereinafter.

Images brought into the processor 10, edited images and compressed images are displayed on the screen HG of the display unit 17 and printed on paper by means of the printer 18.

The processor 10 controls the transfer of data between itself and the aforesaid peripheral devices and processes input data. The processor 10 includes a reducing unit 101, editing unit 102, expanding unit 103, dividing unit 104, arranging unit 105 and RAM 106.

The reducing unit 101 contracts the image data in a prescribed reduction ratio. In the editing unit 102, the image data is subjected to rotation, mirroring, conversion of color, insertion of characters, patching and/or composition of images. The editing unit 102 corresponds to an editing means referred to hereinafter.

The expanding unit 103 expands the image data in a prescribed expansion ratio. The dividing unit 104 forms linear fragmentary images by dividing the image data into sections such that the dividing lines extend in the longitudinal direction. The expanding unit 103 and the dividing unit 104 correspond to a means for forming image data on a plurality of linear fragmentary images referred to hereinafter.

In writing the linear fragmentary image data in the RAM 106, the arranging unit 105 arranges these data in order so as to allow these data to be formed into a compressed image. The arranging unit 105 corresponds to a means for forming compressed images referred to hereinafter.

The RAM 106 is a work area for the execution of the aforesaid various data processing. The RAM 106 also serves as a bit map memory in which compressed images are formed.

A personal computer or a work station in which a suitable program is installed can be used as the apparatus 1. The aforesaid functions of the processor 10 can be realized by executing a program stored in a ROM or RAM.

Referring in more detail to the operation of the apparatus 1, reference should be made to FIGS. 1 to 4, in which a case where a compressed image FP is formed from three photographs is illustrated. It will of course be apparent to those skilled in the art that the compressed image FP can be formed from two or more than three photographs.

In the first place, three photographs PA, PB and PC having different parallaxes are made ready for use as raw images. The photographs PA, PB and PC can be prepared by taking a plurality of photographs of an object by means of a camera designed to take stereophotographs as disclosed in Japanese Laid Open Patent Application No. 8-54694 and by printing out on a photographic paper. Alternatively, computer graphics may be utilized in forming various images. Ordinarily, the photographs PA, PB and PC are provided on their surfaces with very fine grains and have a very high density of picture elements.

Figure 2:
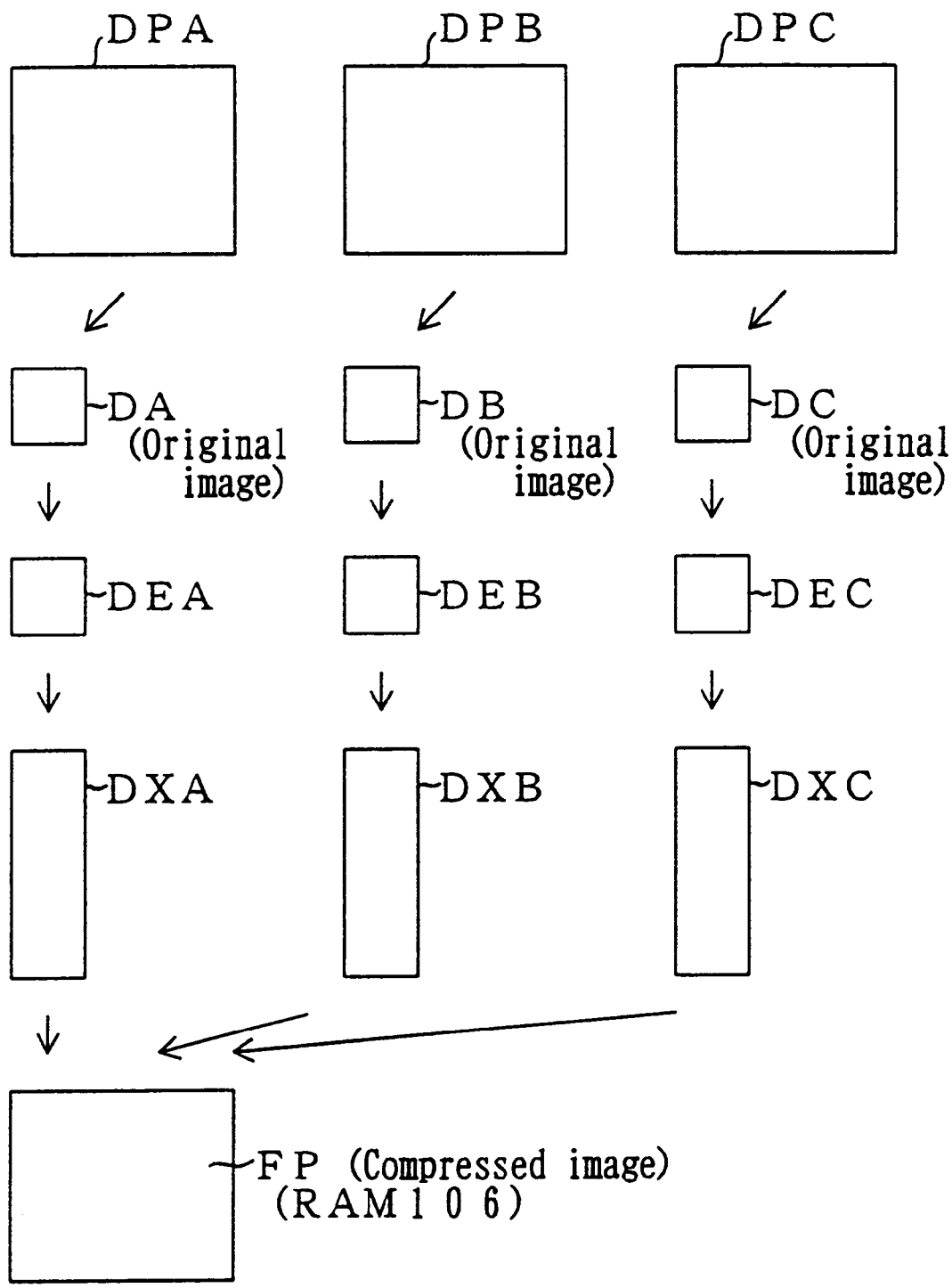
FIG. 2 is a view showing how a compressed image is formed by the apparatus.
Figure 3:
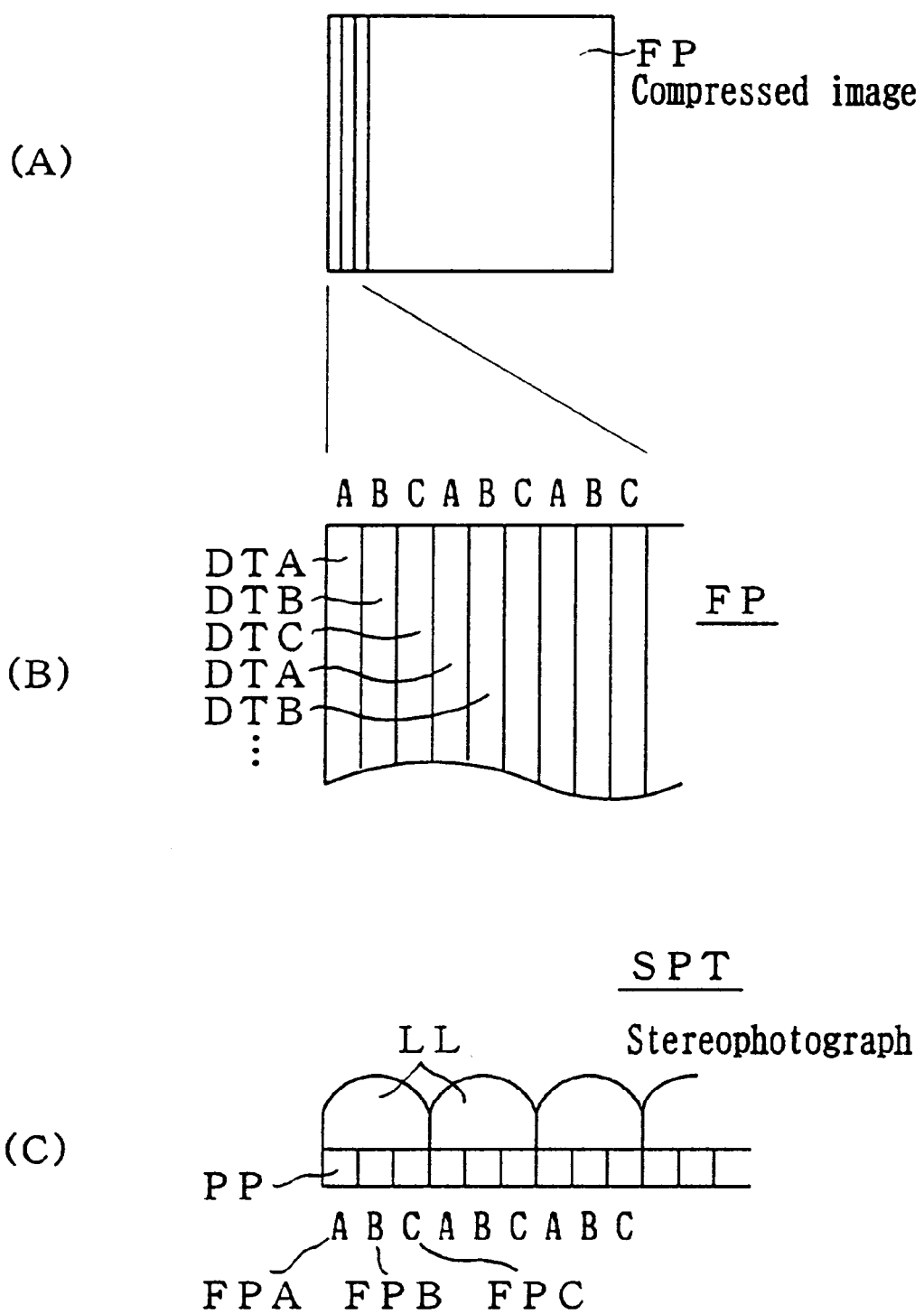
FIGS. 3(A), 3(B), and 3(C) are enlarged detail of a portion of the compressed image.

Raw image data DPA, DPB and DPC as shown in FIG. 2 are obtained when the photographs PA, PB and PC have been read by the image scanner 11 (see step 1 in FIG. 4). These raw image data DPA, DPB and DPC are stored in the magnetic disk unit 16 and can be displayed on the screen HG of a display unit 17 by entering appropriate commands via the keyboard 14 or the mouse 15.

Let it be supposed that the photographs PA, PB and PC are of a cabinet size (i.e. 12 cm×16.5 cm), that the image scanner 11 reads them at a density of 1,160 dpi in the horizontal scanning direction and at a density of 400 dpi in the vertical scanning direction, and that red, green and blue have a color density of 256 gradations (i.e. 1 byte). Then the quantity MDP of raw image data per photograph amounts to about 42.7 megabytes (=12×(400/2.54)×16.5×(1,160/2.54)× 3×1 bytes). Consequently, the total amount of raw image data obtained from three photographs amounts to about 128 megabytes.

In FIG. 2, only the outer frames of the raw image data DPA, DPB and DPC are shown. Raw images, which should actually appear in these outer frames, are omitted for the sake of simplicity.

Then the raw image data DPA, DPB and DPC are reduced to one-fifth both lengthwise and breadthwise. This means that an area covered by each data is reduced to one-twenty-fifth. The reduction is carried out in a manner well known in the art, such as by subsample coding, from which reduced image data DA, DB and DC result (step 2), which are stored in the magnetic disk unit 16. The quantity of reduced image data DA, DB and DC is one-twenty-fifth of the quantity of green image data DPA, DPB and DPC. The reduced image data DA, DB and DC correspond to the original image data referred to hereinafter and can be displayed on the screen HG of the display unit 17 by entering appropriate commands via the keyboard 14 or the mouse 15. Because of the fact that only a limited number of picture elements can be displayed on the screen HG, the reduced image data DA, DB and DC displayed on the screen HG are nearly as minute as the raw image data DPA, DPB and DPC displayed thereon.

Then the reduced image data DA, DB and DC are edited, and edited image data DEA, DEB and DEC are obtained (step 3). Nonlimiting examples of editing are conversion of colors, insertion of characters, patching and/or composition of images.

For the purpose of editing, an operator enters appropriate commands via the keyboard 14 or the mouse 15, while taking a look at an original image and an image during the process of editing, both of which are displayed on the screen HG of the display unit 17. At the time of editing, data can be processed at high speed and in a short time, because the quantity of reduced image data DA, DB and DC is one-twenty-fifth of the quantity of green image data DPA, DPB and DPC. Edited image data DEA, DEB and DEC are stored in the magnetic disk unit 16. The edited image data DEA, DEB and DEC correspond to the edited image data referred to hereinafter.

Then the edited image data DEA, DEB and DEC are elongated longitudinally so that the longitudinal dimension after the elongation may be three times as large as that before the elongation. This is because an important feature of the invention is that the elongation ratio to be applied to the edited image data when they are elongated in the longitudinal direction is made equal to the number of images disposed under a lenticule. The number of images disposed under a lenticule may be other than three, although the embodiment shown in FIG. 2 presupposes that three images are disposed under a lenticule. The elongation is carried out in a manner well known in the art, such as by interpolation, from which elongated image data DXA, DXB and DXC result (step 4).

Each of the elongated image data DXA, DXB and DXC is divided in sections such that virtual parting lines extend longitudinally, from which linear fragmentary image data DTA, DTB and DTC result. This means that, for example, the elongated image data DXA is divided into a plurality of linear fragmentary image data DTA. How many linear fragmentary image data an elongated image data should be divided into depends on the width of a lenticule and on the sizes of images to be printed on the paper on the basis of the linear fragmentary image data DTA, DTB and DTC.

The linear fragmentary image data are arranged in order of DTA, DTB and DTC and written in the RAM 106 so as to be formed into a compressed image FP (FIGS. 3(A) and 3(B)) (Step 5).

The compressed image FP is printed on the paper PP by means of the printer 18 (step 6). A stereophotograph SPT is obtained when a lenticular film LL has been mounted on, and secured to, the paper PP (step 7).

The stereophotograph SPT shown in FIG. 3(C) is such that fragmentary images FPA, FPB and FPC resulting from three image data DTA, DTB and DTC respectively are formed under each lenticule LL.

Consequently, the stereophotograph SPT, upon viewing, affords, e.g., the fragmentary image FPA to the left eye of an observer and the fragmentary image FPB to his right eye. This means that he can have stereoscopic vision because he looks at photographs PA and PB at different parallactic angles with his left and right eyes respectively.

Thus the apparatus 1 is characterized in that the reduced image data DA, DB and DC are edited. This means that only a short time is required for editing because a small quantity of data has only to be edited. The longitudinal elongation of the edited image data DEA, DEB and DEC does not result in making the coarseness of the compressed image FP so conspicuous as to lower the quality of the stereophotograph SPT.

In this embodiment, the edited image data DEA, DEB and DEC are elongagted longitudinally and then the elongated image data DXA, DXB and DXC are divided in sections. However, the edited image data DEA, DEB and DEC may be divided into fragmentary image data and then the fragmentary image data may be elongated. In this case, only the elongated fragmentary image data or the compressed image FP obtained therefrom may be stored in the RAM 106 or in the magnetic disk unit 16, instead of storing intermediate image data.

In this embodiment, raw image data DPA, DPB and DPC are obtained when the photographs PA, PB and PC have been read by the image scanner 11, and reduced image data DA, DB and DC are obtained when the raw image data have been reduced to one-fifth both lengthwise and breadthwise. However, the image scanner 11 may be allowed to read the photographs coarsely so that the reduced image data DA, DB and DC may be directly obtained. When the photographs PA, PB and PC are of a small size, the reduced image data DA, DB and DC can be directly obtained.

The reduced image data DA, DB and DC obtained by means of a digital camera may be directly fed to the processor 10 through the PC card interface 12 or the serial interface 13. Alternatively, the reduced image data DA, DB and DC may be read from various recording media and fed to the processor 10 either directly or through a telecommunication line.

The aforesaid stereophotograph SPT is such that three fragmentary images FPA, FPB and FPC are accurately disposed under a lenticule LL. However, in consideration of the projection angle of the lenticule LL, the lenticule LL may be slightly disaligned with the three fragmentary images as disclosed in Japanese Laid Open Patent Application No. 6-309431.

As a further alternative to the aforesaid stereophotograph SPT, six fragmentary images, e.g. FPA, FPA, FPB, FPB, FPC and FPC, may be disposed under a lenticule LL. In this case, an expansion ratio of 6:1 should be applied to the linear fragmentary images when they are expanded in the longitudinal direction.

Changes in the arrangement, construction, and combination of the several parts may be made and substituted for those herein shown and described without departing from the nature and principle of the invention.

What is claimed is:

1. A method of forming compressed images to be seen through a lenticular film, said method comprising the steps of:

storing raw image data in a memory by reading a plurality of raw images;

forming reduced image data relating to a plurality of reduced images by reducing said raw images in the longitudinal and widthwise directions;

forming edited image data relating to a plurality of edited images by editing said reduced images;

forming linear fragmentary image data relating to a plurality of linear fragmentary images by computationally dividing said edited image data using dividing lines running parallel with the longitudinal directions of said edited images and expanding said edited images in the longitudinal direction; and forming compressed image data relating to a compressed image by consecutively interleaving the linear fragmentary images of different ones of said edited images.

2. The method according to claim 1, wherein the plurality of raw images are images of a same object taken from parallaxes.

3. The method according to claim 1, wherein in the reducing step for forming reduced image data, raw images are reduced in the same reducing ratio in the longitudinal and widthwise directions.

4. The method according to claim 1, wherein during said expanding step, the longitudinal dimension of each of the plurality of linear fragmentary images is expanded a number of times equal to the number of the plurality of edited images.

5. The method according to claim 1, wherein said step of forming the compressed image data occurs in a bit map memory.

6. The method according to claim 1, further comprising the step of:

printing the compressed image data relating to the compressed image on a sheet of paper.

* * * * *